(12) United States Patent
Subrahmanyan et al.

(10) Patent No.: US 7,940,806 B1
(45) Date of Patent: *May 10, 2011

(54) SYNCHRONOUS PAYLOAD ENVELOPE MAPPING WITHOUT POINTER ADJUSTMENTS

(75) Inventors: Ravi Subrahmanyan, Windham, NH (US); Glen W. Miller, Haverhill, MA (US); Xingen (James) Ren, Acton, MA (US); Dimitrios Giannakopoulos, Methuen, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/888,930

(22) Filed: Sep. 23, 2010

Related U.S. Application Data

(63) Continuation of application No. 11/478,249, filed on Jun. 29, 2006, now Pat. No. 7,826,490.

(51) Int. Cl.
    *H04J 3/06* (2006.01)
(52) U.S. Cl. ....................................... 370/503
(58) Field of Classification Search ........................ None
    See application file for complete search history.

(56) References Cited

U.S. PATENT DOCUMENTS

2006/0088061 A1* 4/2006 Roberts ................... 370/474
* cited by examiner

*Primary Examiner* — Chirag G Shah
*Assistant Examiner* — Amarnauth Persaud
(74) *Attorney, Agent, or Firm* — Law Office of Gerald Maliszewski; Gerald Maliszewski (57) ABSTRACT

A system and method are provided for mapping information into Synchronous Payload Envelopes (SPEs). The method provides information bytes at a nominal system clock-based data rate, which is about equal to a system clock, but may be adjusted. An external clock has a rate approximately equal to the system clock rate. The method generates SPEs with identically-positioned information bytes, regardless of differences between the system and external clock rates. The SPEs are combined with Transport Overhead (TOH) and transmitted as a message frame at the external clock rate. SPEs are generated maintaining the positions of the information bytes within each SPE, without pointer adjustments, despite differences between the system and external clock rates. Expressed another way, message frames are generated with payload and TOH sections, and the information bytes are located exclusively in the payload sections. As a result, constant pointer values (e.g., H1/H2 or V1/V2) are maintained for all the SPEs.

22 Claims, 5 Drawing Sheets

SYNCHRONOUS PAYLOAD ENVELOPE MAPPING WITHOUT POINTER ADJUSTMENTS

RELATED APPLICATIONS

This application is a Continuation of a pending application entitled, SYSTEM AND METHOD FOR SYNCHRONOUS PAYLOAD ENVELOPE MAPPING WITHOUT POINTER ADJUSTMENTS, invented by Subrahmanyan et al., Ser. No. 11/478,249, filed Jun. 29, 2006, now U.S. Pat. No. 7,826,490.

BACKGROUND OF THE INVENTION

1. Field of the Invention

This invention generally relates to digital envelope-framed communications and, more particularly, to a system and method for loading Synchronous Payload Envelopes (SPEs) in a manner that eliminates the need for frame pointer adjustments.

2. Description of the Related Art

In a synchronous communications network, digital payload data is carried at a particular clock frequency within a synchronous message format. This payload data may include both asynchronous digital data and synchronous digital data originating at a different data rate in a foreign digital network. The Synchronous Optical Network (SONET), and its European counterpart the Synchronous Digital Hierarchy (SDH), provide a standard format of transporting digital signals having various data rates, such as a DS-0, DS-1, DS-1C, DS-2, or a DS-3 signal and their European counterparts within a Synchronous Payload Envelope (SPE), or a container that is a part of a SONET/SDH STS-N/STM-N message frame. In addition to the digital data that is mapped and framed within the SPE or container, the STS-N/STM-N message frame also includes overhead data that provides for coordination between various network elements, and permits data delineation.

One of the benefits of SONET is that it can carry large (high-speed) payloads (above 50 Mb/s). However, the existing slower speed digital hierarchy can be accommodated as well, thus protecting investments in current equipment. To achieve this capacity, the STS Synchronous Payload Envelope (SPE) can be sub-divided into smaller components or structures, known as Virtual Tributaries (VT) for the purpose of transporting and switching payloads smaller than the STS-1 rate. All services below the DS3 and E-3 rates are transported in the VT structure.

In SONET there are four sizes of virtual tributaries, a VT-6 (12 columns of data), VT-3 (6 columns of data), VT-2 (4 columns of data), and VT-1.5 (3 columns of data). A virtual tributary group (VTG) is formed of a single type of VT and by definition each VTG contains 12 columns of data. Thus, there can be one (1) VT-6, two (2) VT-3, three (3) VT-2, or 4 VT-1.5 VTs per VTG. Because there are 12 data columns per VTG, there are seven VTGs within a single STS-1 SPE, with a column of data providing the path overhead data and two (2) columns of stuff data. The VGs are grouped within a Virtual Superframe that comprises four (4) consecutive STS-1 message frames. The VTGs within the superframe each have varying numbers of VTs within them, and together define a virtual SPE. The VTs contained within the virtual SPE may be operated in a fixed or floating mode. In a fixed mode, the VT SPE mapping into the four (4) STS-1 SPEs comprising the superframe is fixed. This reduces the interface complexity and is designed for maximum efficiency of the network elements. A floating VT mode allows the VT SPE to float within the virtual SPE defined for the VTs. A floating VT requires a VT payload pointer and VT path overhead. In the case of a VT floating within a virtual superframe, the VT payload pointer is defined by bytes, V1 and V2. In addition, payload resynchronization and payload adjustment is accomplished using the V1, V2, and V3 in the same manner as the H1, H2, and H3 bytes in the transport overhead of the STS-1 message as described below.

Similarly, in a SDH STM-1 format, which is based on a 2.048 Mbit/s hierarchy, there is a bandwidth flexible virtual container (VC) that permits the transmission of high-speed packet switched services, ATM, contribution video, and distribution video. In addition, the VC permits transport and networking at the 2 Mbit/s, 34 Mbit/s, and 140 Mbit/s in addition to the 1.5 Mbit/s hierarchy.

The lowest level of multiplexing in a SDH message includes a single container (C). The containers are used to create a uniform virtual container (VC) payload through bit-stuffing to bring all the inputs to the container to a common bit-rate that is suitable for multiplexing in the VCs. There are two levels of VCs. A low level VC, i.e., VC-11, VC-12, and VC-2, includes data at a rate from 1.5 Mbit/s to 6 Mbits/s. Upper level VCs, i.e., VC-3 and VC-4, include data at a rate of 34/45 Mbit/s and 140 Mbit/s. The various VCs are converted into Transmission Units (TUs) with the addition of tributary pointer information. Thus, a VC-11 becomes a TU-11, a VC-12 becomes a TU-12, a VC-2 becomes a TU-2, and a VC-3 becomes a TU-3.

A single TU-2 or 3 TU-12s, or 4 TU-11s are combined into a Transmission Unit Group 2(TUG-2). Seven TUG-2s can be used to form a VC-3 or a TUG-3. Three TUG-3s are combined to form a VC-4. A single VC-3 or a single VC-4 are converted into an administrative unit three (AU-3) or an AU-4 respectively, with the addition of an administrative unit pointer. Three AU-3s or a single AU-4 are formed into an Administrative Unit Group (AUG). One AU-4, four AU-4s, or 16 AU-4s are formed into an STM-1, STM-4, or an STM-16, respectively. The administrative unit group forms the SPE of the SDH STM-1.

In a floating TU mode, four consecutive 125 microsecond frames of the VC-4 are combined into a single 500 microsecond called a TU multi-frame. The tributary units comprising the TU multi-frame signal also contain payload pointers to allow for flexible and dynamic alignment of the VCs within the TU multi-frame. In this instance, the payload pointer value indicates the offset from the TU to the first byte of the lower order VC. This mechanism allows the AU and TU VC payloads to vary with respect to phase to one another and to the network, while allowing the VCs comprising the AUs and TUs to be synchronously multiplexed. The TU multi-frame overhead consists of four bytes: V1, V2, V3, and V4. Each of the four bytes is located in the first bytes of the respective TU frame in the TU multi-frame signal. The V1 and V2 bytes designate the position of the first byte of the VC, the V3 byte provides a payload pointer adjustment opportunity, and the V4 byte is reserved. Thus each of the VCs within an STM can float relative to one another.

If the digital data that is mapped and framed in the STS-N/STM-N is originally carried by a clock signal having a different frequency than the SONET/SDH line rate clock, certain adjustments to the framed digital data must be made. For example, if a DS-3 data signal, which is timed by a 44.736 MHz DS-3 clock signal, is to be carried in a SONET/SDH fiber-optic network, the DS3 signal is mapped into the higher rate SPE of an STS-1, and extra bits must be added to the DS-3 signal prior to transmission through the SONET/SDH network. These extra bits are commonly referred to as stuff bits or gap bits, and are place markers and may, or may not carry valid data. These gap bits are required because the DS-3 signal is slower than the SONET/SDH clock frequency, so that there are not enough DS-3 bits at the higher frequency to form a complete SONET frame. More detail may be found in the Bellcore specification "SONET Transport Systems: Common Generic Criteria", GR-253-CORE, Issue 3, September 2000, the Bellcore specification "Transport Systems Generic Requirements (TSGR): Common Requirements", GR-499-CORE, Issue 2, December 1998, and the ITU-T Recommendation G.783, "Characteristics of Synchronous Digital Hierarchy (SDH) Equipment Functional Blocks", January 1994.

When the STS-1 is received at a network exit node, the overhead bytes are removed from the SONET STS-1 and replaced by gaps in the data stream. The payload data that remains is de-framed and de-mapped into a data stream carried at a higher clock frequency than the nominal original clock frequency of the payload data. The stuff data that was inserted when the data was mapped into the SPE remains when the data stream is recovered from the SPE, and is also replaced by gaps in the data stream. Thus, the recovered payload data contains gaps in the data stream remaining after the overhead bytes and stuff data bits have been removed. If, for example, DS-3 data has been transported via a SONET/SDH network, the DS-3 data must be converted from the SONET clock signal to the lower frequency DS-3 clock signal and the gap data bits must be removed prior to the DS-3 signal being B3ZS-encoded for electrical re-transmission.

To transfer data from one clock domain to another, for example from the DS-3 embedded within the SONET signal rate to the proper DS-3 signal rate, a desynchronizer is used to provide a buffering mechanism between the clock domains. A desynchronizer typically includes an elastic store first-in-first-out memory buffer that receives gapped data recovered from a synchronized data payload as an input at one clock frequency and stores the data in appropriate storage locations.

Although the SONET/SDH fiber optic network is a synchronous network, variations in clock signals across the network may occur. These variations in clock signals between various network elements may cause a loss of data downstream from the sender if the clock signal at which data was written to the synchronous signal and the clock signal at which the data was read from the synchronous payload are sufficiently different. A variety of conditions can cause variations in clock signals. For example, network clock instability, electrical noise and interference, effective changes in the length of transmission media, changes in the velocity of propagation, Doppler shifts, irregular timing information, and other electrical and network problems may all cause clock variations.

To mitigate the problems caused by clock variations across a network, the SONET/SDH STS-N/STM-N messages are provided with a pointer adjustment mechanism within the transmission overhead bytes that permit some movement of the data within the SPE. The pointer adjustment mechanism includes a pair of bytes, H1 and H2, which identify the start of the next SONET/SDH payload byte and also indicate if the pointer adjustment byte, H3, is to be used. The third overhead byte (H3) provides for active pointer adjustment when a negative justification of the SPE is required. Negative justification involves posting valid data in the H3 byte. Positive justification involves marking the byte after the H3 byte as a dummy or stuff byte. These pointer adjustments allow for eight (8) bits of data to be added to a SONET/SDH message frame (using the H3 overhead byte) or for eight (8) bits to be removed from the frame. This allows for the SPE to be re-framed and re-synched at a network node that has a slightly different network clock. Thus, in addition to the gap data necessary to compensate for payload data that is carried by a different frequency clock signal, eight bits of data may be added or removed at each network element in the network due to clock instability in the network.

Pointer adjustments can be periodic or aperiodic in nature. A periodic pointer adjustment may be caused, for example, when the SPE transporting the data has a constant clock offset at the output node of the network relative to the input node. An aperiodic or non-periodic pointer adjustment may be bursty in nature when caused by a transient problem or condition within the network.

Although the synchronous system may adjust the payload data using pointer adjustments to account for clock and phase variations, the clock and phase shifts caused by the pointer adjustments and/or the de-gapping of the payload data can affect the output rate of the data clock provided by the PLL. Typically, clock and phase shifts have two components. One is a high frequency jitter component that is classified as a clock or phase shift that is greater than, or equal to 10 Hz. A second is a low frequency wander component that is classified as a clock or phase shift that is less than 10 Hz.

Jitter refers to the phase variations in the clock signal, which may cause errors, in identifying bit positions and values accurately, and is therefore an issue in synchronous systems. The jitter requirement for SONET can be found in the ANSI document "Synchronous Optical Network (SONET)—Jitter at Network Interfaces", ANSI-T1.105.03-1994. Wander refers to phase variations that typically affect the frame and time-slot synchronization. The wander requirement for SONET can be found in the ANSI document "Synchronous Optical Network (SONET)—Jitter at Network Interfaces—DS3 Wander Supplement", ANSI-T1.105.03b-1997. Each network element adds some amount of noise to the SPE that eventually contributes to the timing instability in the form of jitter and wander in the recovered payload signal.

As is known, the PLL used to recover the smooth clock signal and smooth data signal is able to smooth out some phase jumps caused by pointer adjustments or asynchronous stuff bits. A PLL is most effective at filtering out high frequency jitter components, i.e., those with a frequency greater than 10 Hz, but is less effective at filtering out the low frequency wander components. Since, typically the wander components are much less than 10 Hz, these wander components are well within the bandwidth of the PLL and are passed without being attenuated. To construct a PLL with a small enough bandwidth to filter the wander components of the phase jumps, large time constants in the PLL control loops would require large component values for the resistors and capacitors used in the PLL. In addition, the large time constants required would result in a PLL that is slow to lock onto the reference signal and would cause long delays in recovering lock after a transient event.

One source of wander errors in the output data rate can be caused by the pointer adjustments within the synchronous signals. Each pointer adjustment signal or asynchronous gap data results in a data gap for a given number of clock cycles. For example, an 8-bit pointer adjustment that occurs once a second or less, is a low frequency change in the data rate.

When a pointer adjustment is received however, there are eight bits that are added to the elastic store, or skipped, and not written to the elastic store. The inconsistent nature of the gapped data can result in large changes in the data output rate. The ratio between the input data rate and the output data rate may change by a value sufficiently large that the elastic store can experience a data overflow condition or a data underflow condition. Data overflow occurs when data is written to the elastic store at a faster rate than usual, or read at a slower rate than usual, causing the elastic store to accumulate data. In these conditions, the elastic store may be unable to store all of the incoming data, and data may be lost. Similarly, data underflow occurs when data is written to the elastic store at a slower rate than usual, or read at a faster rate than, usual, causing the elastic store to lose data. In this circumstance no data is read from the elastic store.

Typically, the elastic store used in the desynchronizer has a write/read control system that attempts to maintain the output data rate at a specified rate, and maintain the elastic store at a predetermined fill level. If the elastic store begins to overfill, the write/read control system increases the data output rate of the elastic store until the proper storage level in the elastic store is reached. Once the proper storage level is reached, the write/read control system decreases the data output rate. If the elastic store begins to underfill, the write/read control system will decrease the data output rate of the elastic store until the proper storage level in the elastic store is reached. Once the proper level is reached, the write/read control system increases the data output rate.

As noted above, the VT or TU-11/12 pointer bytes V1, V2, and V3 operate in the same manner as the H1, H2, and H3 pointer bytes described herein. Similar problems related to the processing of the VT pointer bytes occur, and the positive justification of the VT pointer bytes is accomplished by assigning the bytes immediately after the V3 bytes as positive stuff opportunity bytes. Negative justification is accomplished by assigning the V3 byte to contain valid data. The frequency and polarity of the pointer adjustments to the VT pointer bytes is uncorrelated to the frequency of the pointer adjustments made by the SONET/SDH H1-H2-H3 pointer bytes. In addition, the wander and jitter associated with the pointer adjustments is also uncorrelated between the transport overhead pointer bytes and the VT overhead pointer bytes.

It would be advantageous if information could be mapped into SPEs without the use of pointer adjustments, or positive and negative justification.

It would be advantageous if pointer adjustments could be minimized in the transmissions of a system receiving communications from multiple networks using different (unsynchronized) clocks.

SUMMARY OF THE INVENTION

SONET loop timing is required in some applications in order to avoid SONET pointer movements from occurring. In these cases it is desirable to map a client (PDH) signal into the SONET payload or directly map data into a SONET payload in a manner that keeps the mapping quality at a certain level. The present invention describes a method and associated circuitry that permits SONET line loop timing in a manner that minimizes the impact to the PDH mapping. The general application is for mapping into a line clock that is different from the system clock for any reason, such as loop timing.

Accordingly, a method is provided for mapping information into Synchronous Payload Envelopes (SPEs). The method provides information bytes at a nominal system clock-based data rate, which is about equal to a system clock, but may be adjusted. An external (line) clock has a rate approximately equal to the system clock rate. It is the difference between the system and external clock rates that typically creates a need for pointer adjustments. The present invention method, however, generates SPEs with identically-positioned information bytes, regardless of differences between the system and external clock rates. The method combines the SPEs with Transport Overhead (TOH), creating message frames, and transmits the message frames at the external clock rate.

SPEs are generated maintaining the positions of the information bytes within each SPE, without pointer adjustments, despite differences between the system and external clock rates. Expressed another way, the message frames are generated with payload and overhead sections, and the information bytes are located exclusively in the payload of each message frame. As a result, constant pointer values (e.g., H1/H2 or V1/V2 pointer) are maintained for all the SPEs. Likewise, constant pointer values are maintained between message frames.

More specifically, the provision of information bytes at the nominal system clock-based data rate means that the information bytes are written into a first buffer at a rate about equal to the system clock rate, and loaded into a message frame payload section at the external clock rate. The buffer is monitored. In the event of monitoring a buffer underfill condition, data is written at a rate faster than the system clock rate. In the event of monitoring a buffer overfill condition, data is written at a rate slower than the system clock rate.

Additional details of the above-described method and a system for mapping information into an SPE are provided below.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

Although the apparatus described herein has application to any synchronous communication system, exemplary aspects of the invention are presented below in the context of a synchronous optical network (SONET) receiver and desynchronizer.

Figure 1:
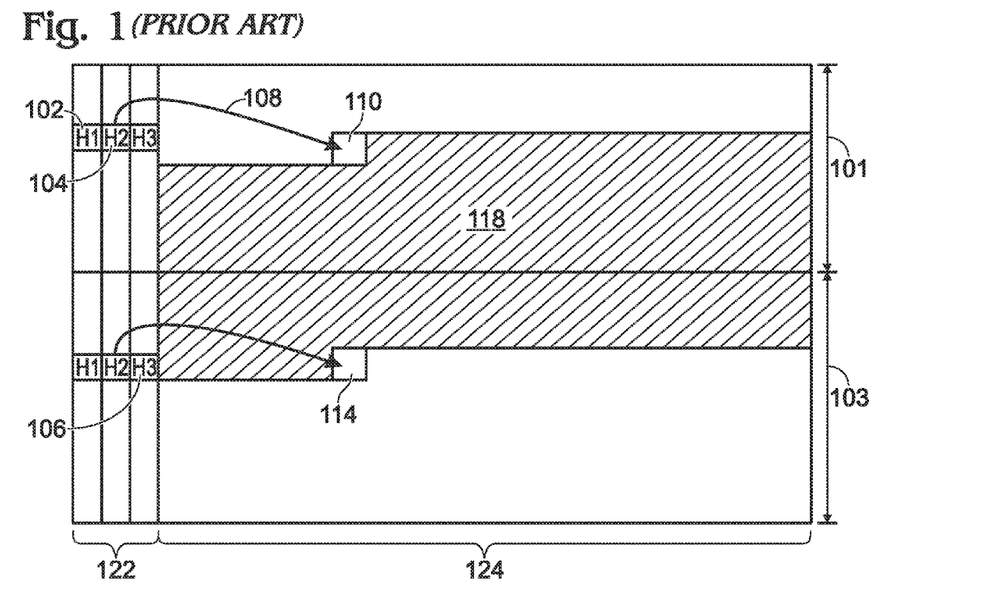
FIG. 1 depicts, as an illustrative example, two basic SONET/SDH STS-1/STM-1 message frames (prior art).

FIG. 1 depicts, as an illustrative example, two basic SONET/SDH STS-1/STM-0 message frames 101 and 103 (prior art). As defined within the SONET specification, each SONET message frame has a frame length of 125 microseconds (μs) and includes data arranged in 9 rows by 90 columns. These 810 bytes of data are divided into two parts. The first part is the transport overhead 122, which includes the first 3 columns of data. The second part is the payload data area 124, which includes columns 4 through 90. The payload data area 124 includes a synchronized payload envelope (SPE) 118 per frame. As depicted in cross-hatch, the SPE 118 can extend between STS-1 message frames, wherein the SPE 118 associated with the first STS-1 message frame begins in a first frame 101 and ends in a second frame 103. Since the SPE 118 does not have to be aligned with the payload data area, overhead bytes 102 and 104 are assigned as pointers to point 108 to the first byte (110) of the SPE 118, and to identify when a positive or negative pointer adjustment is needed to be made by the H3 byte 106.

As discussed above, the SPE 118 can include one or more virtual tributaries (VTs) that are contained within seven virtual tributary groups (VTGs) in each STS-1 SPE. Four (4) consecutive STS-1 message frames (two are shown) form a virtual superframe. The virtual superframe (superframe) defines a virtual SPE having a virtual envelope capacity that can vary from one superframe to another. The virtual SPEs can also extend between virtual superframes. The tributary units comprising the virtual superframe also contain payload pointers to allow for flexible and dynamic alignment of the VTs within the virtual superframe. In this instance, the payload pointer value indicates the offset from the beginning of the virtual superframe to the first byte of the VTG.

Similarly, the SDH SPE can include one or more virtual containers (VCs) that are combined into transmission units (TUs) with the addition of overhead information. The TUs are combined into transmission unit groups (TUGs) that are further combined into administrative units (AUs). Four consecutive 125 microsecond frames of the VC-4 are combined into a single 500 microsecond called a TU multi-frame. The tributary units comprising the TU multi-frame signal also contains payload pointers to allow for flexible and dynamic alignment of the VCs within the TU multi-frame. In this instance, the payload pointer value indicates the offset from the TU to the first byte of the lower order VC. This pointer mechanism allows the VC payloads to vary in phase with respect to one another and to the network as well, while allowing the VCs comprising the AUs and virtual superframes to be synchronously multiplexed.

The overhead data associated with the virtual superframe or the TU-multiframe are provided in a plurality of bytes that includes four (4) bytes used to perform payload pointer functions. The superframe/TU-multiframe overhead bytes V1 and V2, following STS POH bytes 110 and 114 respectively, are used to point to the first byte of a VT SPE (not shown). A V3 overhead byte (not shown) is used during VT pointer adjustment operations.

As discussed above with respect to the STS-1 SPE, the pointer adjustment mechanism includes the pair of bytes, H1 and H2, which identify the start of the next SONET/SDH payload byte and also indicate if the pointer adjustment byte, H3, is to be used. The supergroup or administrative unit group pointer adjustment occurs in substantially the same manner as described above with respect to the STS-1 message frame. The third overhead byte (V3), provides for active pointer adjustment when a negative justification of the virtual SPE is required. Positive justification involves marking the byte after the V3 byte as a dummy or stuff byte. These pointer adjustments, which are pointed to by the V1 and V2 transmission overhead bytes, allow for eight (8) bits of data to be added to a virtual group (using the V3 overhead byte) or for eight (8) bits to be removed from the frame. This allows for the virtual superframe/TU multiframe to be re-framed and re-synched at a network node that has a slightly different network clock. Thus, in addition to the gap data necessary to compensate for payload data that is carried by a different frequency clock signal, eight bits of data may be added or removed at each network element in the network due to clock instability in the network.

In general, the two pointer vectors, i.e., the SONET/SDH transmission overhead H1 and H2 bytes and the virtual superframe/TU-multiframe pointers V1 and V2, are statistically independent of one another. As such, the period of one pointer vector is not correlated with the period and polarity of the other pointer vector.

Figure 2:
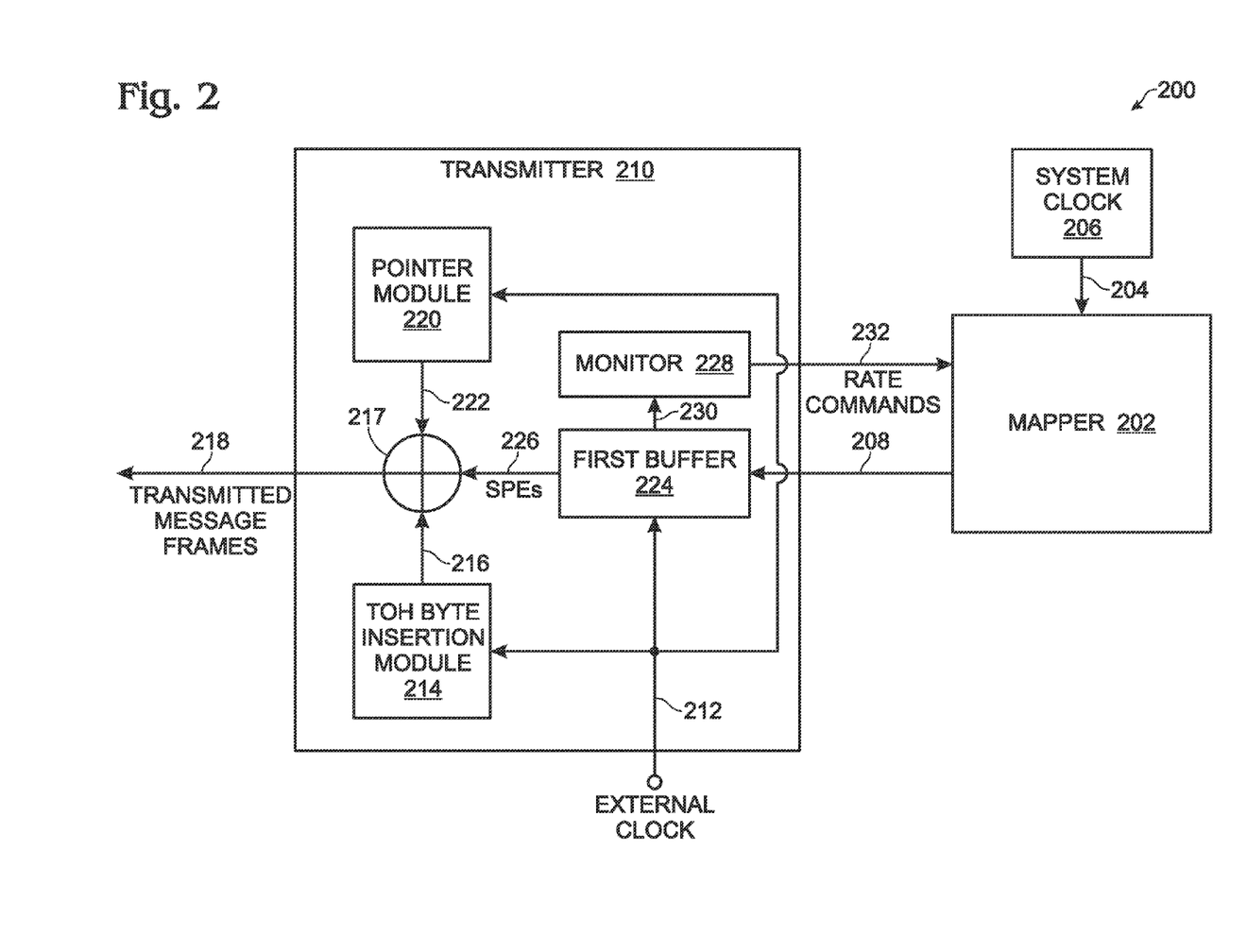
FIG. 2 is a schematic block diagram of a system for mapping information into Synchronous Payload Envelopes (SPEs).

FIG. 2 is a schematic block diagram of a system for mapping information into Synchronous Payload Envelopes (SPEs). The system 200 comprises a mapper 202 having an interface on line 204 to accept a system clock. That is, a system clock signal is received on line 204 from system clock 206. The mapper 202 has an interface on line 208 to provide information bytes at a nominal system clock-based data rate responsive to the system clock. As explained in more detail below, the nominal system clock-based data rate is an adjustable rate approximately equal to the system clock rate, used for writing data into a transmitter 210.

The transmitter 210 has an interface on line 208 to accept the information bytes from the mapper 202. The transmitter 210 has an interface on line 212 to accept an external clock with a rate approximately equal to the system clock rate. A Transport Overhead (TOH) byte insertion module 214 generates and supplies TOH bytes on line 216. A summing module 217 combines the TOH on line 222 with the SPEs on line 226, and transmits message frames at the external clock rate on line 218. Each message frame transmitted has TOH and identically-positioned information bytes, regardless of differences between the system and external clock rates. The transmitter 210 maintains the positions of the information bytes within each SPE, without pointer adjustments, despite differences between system and external clock rates.

Referencing FIG. 1 and the discussion above, the transmitter 210 transmits message frames with payload and TOH sections in the conventional manner, and exclusively locates information bytes in the payload of each message frame. Thus, the V3 or H3 bytes are not used to carry data, as is conventionally required for a negative justification. In one aspect (as shown), the transmitter includes a pointer module 220, as is conventional, with the pointer module 220 generating and supplying pointer bytes on line 222. The summing module 217 locates the pointer bytes in the TOH of the message frames. As is conventional, the pointer bytes point to the start of a subsequent SPE, however, in this aspect of the system 200, the pointer byte values remain constant for each SPE. Likewise, the pointer byte values remain constant between message frames. That is, the pointer byte values remain constant in each message frame. In other aspects of the system presented below, the pointer module is enabled in the mapper. That is, the pointer bytes are provided with the information bytes (but not the TOH bytes) on line 208. For example, transmissions using STS SPEs maintain constant H1 and H2 pointer byte values, and VT format transmissions maintain constant V1 and V2 pointer byte values.

The present invention system permits the mapping of information into SPEs, while maintaining constant pointer byte values. However, it should be realized that the transmissions originated using the system 200 still include pointer bytes. Therefore, the pointer bytes may still be used as in conventional systems. In some aspects, the pointer bytes are used as conventional, but the present invention system minimizes the use of pointer byte adjustments in transmitted message frames.

In another aspect (as shown), the transmitter 210 includes a first buffer 224 having an interface on line 208 for writing information bytes received from the mapper 202 at a rate about equal to the system clock rate. The first buffer 224 has an interface on line 226 for supplying the buffered information bytes at the external clock rate, for insertion into a message frame payload section.

In this aspect the transmitter 210 includes a monitor 228 having an interface on line 230 to monitor the number of bits loaded in the first buffer 224. The monitor 228 has an interface on line 232 to supply rate commands to the mapper 202. The rate commands are used for modifying the first buffer writing rate in response to the monitoring. Alternately stated, the rate commands are used to vary the system clock rate-based data rate. In the event of monitoring a first buffer underfill condition, the monitor 228 sends a rate command to the mapper 202 to supply data at a rate faster than the system clock rate. In the event of monitoring a first buffer overfill condition, the monitor sends a rate command to the mapper 202 to supply data at a rate slower than the system clock rate.

In one exemplary aspect, the mapper 202 supplies a Plesiochronous Digital Hierarchy (PDH) data stream to the transmitter 210 on line 208, and the transmitter 210 transmits Synchronous Digital Hierarchy (SDH)/Synchronous Optical Network (SONET) frames on line 218.

Figure 3:
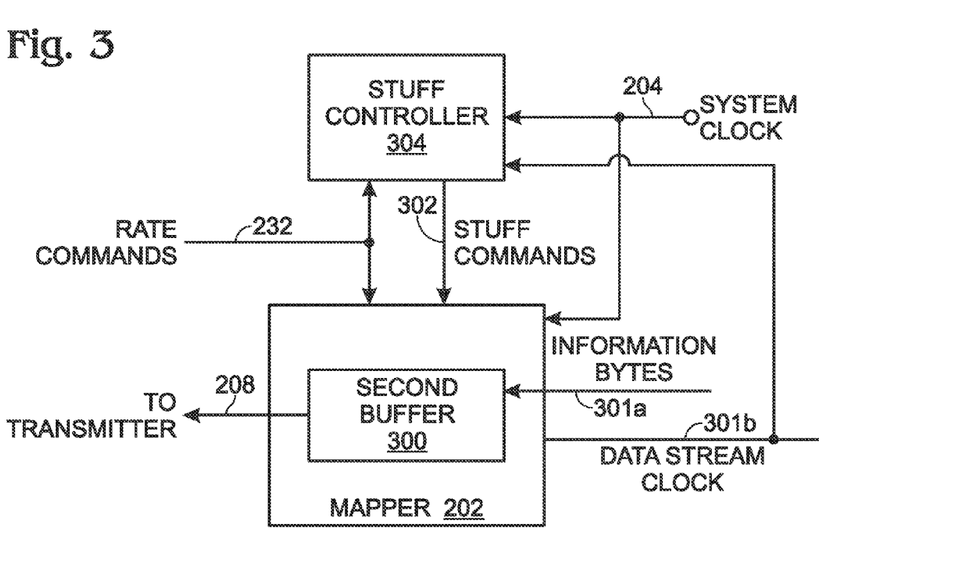
FIG. 3 is a schematic block diagram of a first variation of the SPE mapping system of FIG. 2.

FIG. 3 is a schematic block diagram of a first variation of the SPE mapping system of FIG. 2. The system of FIG. 2 is able to accommodate differences between the system and external clocks without the use of pointer adjustments. As noted above, another source of timing variations is associated with the assembly of the various data channels that form the payload of the SPEs. Conventionally, the difference between different received data clock rates, or the difference between the system clock and data clock rates is accommodated with the use of stuff bits. In some aspects, the data clock rate may be derived from the system clock. Therefore, the nominal data clock rate is related to the nominal system clock rate, but differences may accrue due to gapping and stuff bits in the information bytes.

In FIG. 3, the mapper 202 includes a second buffer 300 having an interface to accept information bytes on line 301a at a data stream clock rate. The data stream clock is received on line 301b. The mapper 202 has an interface on line 232 to accept rate commands from the monitor (not shown), and an interface on line 302 to accept stuff commands for controlling stuff bit opportunities in the information bytes. A stuff controller 304 has an interface on line 204 to accept the system clock, an interface on line 301b to accept the data stream clock, and an interface on line 232 to accept the rate commands. The stuff controller 304 compares the data stream clock rate to the system clock rate and rate commands, and provides stuff commands to the mapper responsive to comparisons. Although only a single data line 301a and data stream clock line 301b are shown, it should be understood that the system may accept multiple channels of data, each with its own clock.

Figure 4:
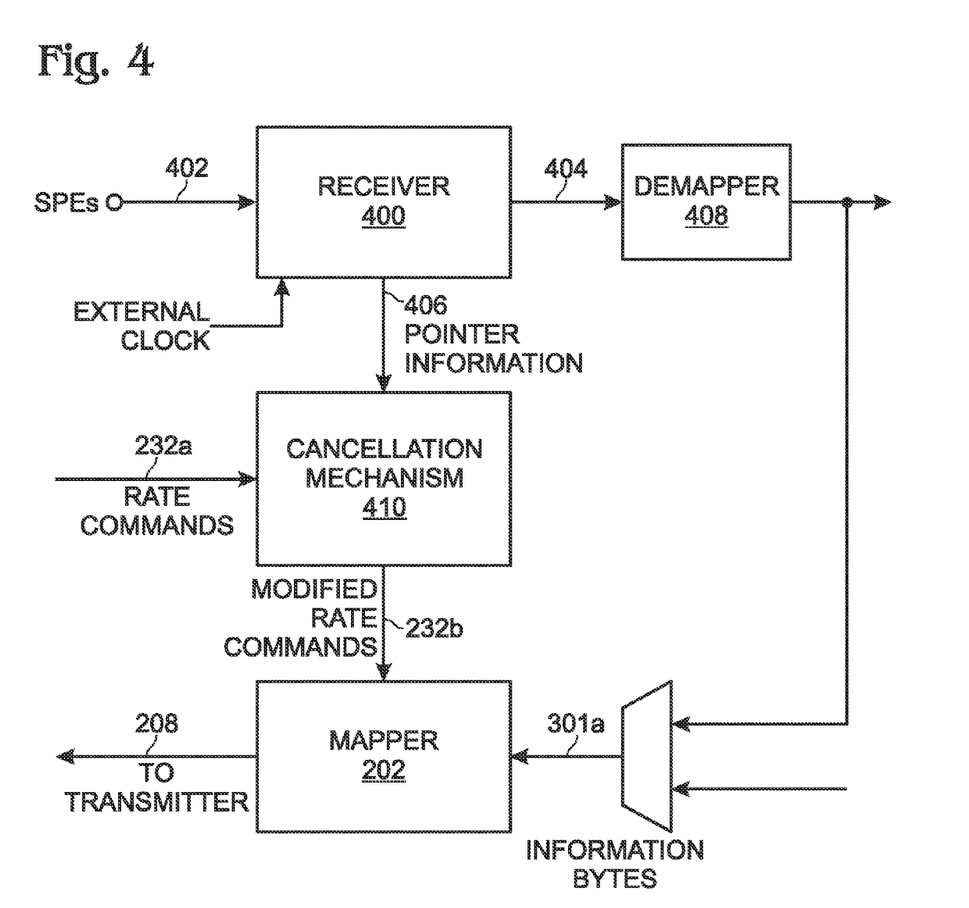
FIG. 4 is a schematic block diagram of a second variation of the SPE mapping system of FIG. 2.

FIG. 4 is a schematic block diagram of a second variation of the SPE mapping system of FIG. 2. In this aspect, a receiver 400 has an interface on line 402 to accept SPEs at the external clock rate, which may also be referred to as a line clock rate. The receiver 400 has an interface on line 404 to supply accepted SPE information bytes to the mapper 202, and an interface on line 406 to supply SPE pointer information. A demapper 408 takes the accepted SPE information bytes and demaps the SPE into channels. Some or all of the channels may be supplied to the mapper 202 as information for transmission.

A cancellation mechanism 410 has an interface on line 406 to accept the SPE pointer information from the receiver 400, and an interface on line 232a to accept the rate commands from the transmitter monitor (not shown). The cancellation mechanism 410 has an interface on line 232b to supply rate commands to the mapper 202, adjusted in response to the combination of the decoded SPE pointer information and the rate commands on line 232a. Then, the mapper 202 supplies information bytes to the transmitter first buffer (not shown) in response to the adjusted rate commands via line 208.

In one aspect, the adjusted rate commands permit the mapper 202 to supply information bytes to transmitter first buffer at the external clock rate. In a sense, the cancellation mechanism 410 nullifies any differences between the system clock (the operation of the mapper 202 and demapper 408) and the external clock rate used to operate the transmitter 210 and receiver 400.

Typically, the system aspects shown in FIGS. 3 and 4 may be merged together, so that the transmitter 210 transmits SPEs with data channels from received SPEs (i.e., FIG. 4), along with stuff bit adjustments (FIG. 3).

Functional Description

In a typical SONET application, a PDH signal is mapped into SONET and carried over the network by the SONET signal. At the destination, the PDH signal is re-extracted (desynchronized) in a manner that maintains the quality of the PDH signal to a level described in the standards. In some applications, the extracted PDH signal is used to loop-time the mapping of another data stream, and in this case the mapped signal preserves the timing of the incoming PDH signal that is used for the loop timing (to within a certain level).

When the SONET signal crosses clock domains, pointer adjustments are conventionally required at either the STS level or the VT level. The standards require that the impact of these pointer adjustments on the timing of the PDH signal be controlled within certain limits. Specifically, when there are pointer adjustments, the desynchronizer that demaps the PDH signal must attenuate the impact of these pointer adjustments.

The SONET signal in general carries multiple PDH signals (e.g., up to 12 DS3s or E3s in an STS-12, up to 84 DS1s or 63 E1s in an STS-3). One conventional implementation of a demapper/mapper extracts all the PDH signals, along with their associated clocks, and uses those clocks to loop-time the second data stream and remap it into SONET.

In other (typically high-density) conventional applications the demapped PDH signals may be used directly in a mapper to loop-time remap the second data stream, without specifically extracting the clock of the PDH signal. In these high-density applications, a common clock domain ("system clock") is used to process all the signals and is the source of the mapped SONET payload. In this case, the system clock is used to map all the loop-timed signals into a common SONET payload envelope (SPE), though the timing of each of the individual PDH signals is preserved through the mapping process.

If the rate of the outgoing SONET line clock, which is referred to herein as the external clock rate, is different from the rate of the system clock used to create the payload envelope into which all the PDH signals are mapped, then pointer adjustments may be used to accommodate the difference between the SPE rate and the line (external) rate. These pointer adjustments are seen on the outgoing line. These pointer adjustments do not impact the mapping of the PDH signal because that is done prior to the pointer generation— the mapping in this case depends only on the timing of the incoming signal and the clock used to generate the SPE (the system clock). However, these pointer adjustments will impact the eventual quality of the demapped signal at the far end when the PDH signal is finally demapped from the SONET line, at which point the impact of the pointer adjustments are handled by the far-end desynchronizer.

The number of pointer adjustments on the outgoing line is a function of the rate difference between the line (external) clock and the mapping (system) clock. Most SONET networks have very well controlled clocks, and there are few pointer adjustments. The number of pointer adjustments is often used as an indication of network clocking integrity. It is therefore desirable to minimize the number of outgoing pointers in order to maintain compatibility with existing network architectures, which count the number of pointer adjustments and declare faults if they cross a predefined threshold.

Because network clocking is so important, providers often require that SONET clocks be loop-timed in order to ensure that the clock coming back to them is the same as the clock they sent out. But then, in order to prevent pointer adjustments, it is necessary to derive the system clock (which is used for mapping as described earlier) from the incoming line clock. In applications with one incoming/outgoing SONET line (e.g., an OC-12 application), a clock can be recovered from the line and used as the system clock. But in applications with multiple incoming/outgoing lines (e.g., a 4xOC-3 application), the lines may all have independent SONET clocks, so it is not possible to derive a single system clock which works for all line clocks. It is possible to replicate the mapping circuitry and have 4 slices each running off a different system clock, but this leads to considerable hardware inefficiencies (this would be like having 4 separate 1xOC-3 chips).

This present invention system permits a single system clock to map all the client PDH signals into a common SPE with multiple line clocks (e.g. in the line loop timing case) while still maintaining mapping quality. The system clock may be completely independent of the line clocks, e.g., in a single line (like OC-12) or multi-line (like 4xOC-3) case where it is not possible or not desirable to derive the system clock from the line clock. Alternately, the system clock may be derived from one of the line clocks in a multi-line application.

Conventionally, the SPE is usually defined with respect to the system clock, i.e., the SPE is in a "fixed frame" with respect to the system clock. A mapper maps a PDH signal into an SPE by adjusting the stuff bits provided in the mapping format. These stuff bits permit the mapper to accommodate the rate of the incoming signal within the available bandwidth of the SPE. When the line clock is different from the system clock, the standard SONET pointer adjustment mechanism can be used to accommodate the SPE within the available bandwidth of the outgoing SONET frame. This is done by periodically sending extra or fewer SPE bytes within some outgoing SONET frames. This process may be referred to as "floating" the SPE and moving it within the outgoing SONET frame. When the outgoing line rate is faster than the rate at which the SPE is assembled by the system clock, an empty space is periodically left in the outgoing frame by delaying the SPE by a byte-time; this is called a positive pointer adjustment. When the outgoing line rate is slower than the rate at which the SPE is assembled by the system clock, an available extra byte position (which is normally left empty) is used to send one more SPE byte in the outgoing frame than would otherwise be sent, which sends the SPE out faster than it would otherwise have gone out; this is called a negative pointer adjustment.

Instead of creating the SPE in a fixed frame and then moving it relative to the outgoing frame, it is possible to create a fixed frame with respect to the outgoing clock and modifying the SPE that is being created by adding a byte (sending a byte earlier than usual) or deleting a byte (sending a byte, and all succeeding bytes, later than usual) from it. When the line clock is faster than the system clock, which conventionally creates a negative pointer, an extra available byte position is added to the SPE being created by the system clock. When the line clock is slower than the system clock, which conventionally creates a positive pointer, an available byte position is deleted from the SPE being created by the system clock.

The above-described present invention process creates a phase adjustment backwards into the system clock direction, rather than outwards in the line clock direction, which is equal in magnitude but opposite in polarity to the outgoing pointer that is created in a conventional implementation. One point to recognize that when an extra (or fewer) number of SPE bytes are put into the frame, which ultimately results in extra (or fewer) mapped data going out over the SONET frame, then the pointer adjustment ultimately results in a corresponding change to the outgoing rate of the mapped signal.

Therefore, instead of creating the SPE in a fixed frame and then moving it (which creates pointers), the accommodation of the data rate within the SONET rate defined by the line clock can be accomplished creating an SPE which is fixed relative to the line (external) clock, by suitably mapping the PDH data. The stuff mechanism can be used to accommodate the PDH rate directly into the line-rate-SONET, while still using common system clock for all PDH channels and all SONET lines, rather than replicating the circuitry for each line and having a separate clock for each PDH signal.

In order to maintain the quality of the mapping to applicable standards, these "backwards" phase adjustments must be taken into account during the mapping process. The mapper conventionally includes a pointer attenuation circuit to accommodate pointers received on the incoming line. This pointer attenuation circuit can be modified to handle the extra phase adjustments accruing from differences between the line clock and the system clock, in order to attenuate the effect of these phase adjustments. These above-mentioned "extra phase adjustments" would conventionally take the form of pointers that must be decoded and handled by a far end desynchronizer.

In the particular case of line loop timing, the phase adjustments on the outgoing side are matched by equal and opposite phase adjustments on the incoming side (since the same difference between the line and system clocks exists both on the incoming and outgoing sides), though these adjustment may not occur at the same time. In this case, it is possible to have a buffer or cancellation mechanism which exactly cancels out the effect of these phase adjustments.

Although the above discussion describes the mapping of PDH signals into SONET, the concept also applies to the direct mapping of any signal into SONET, especially in the particular case of line loop timing described in the previous paragraph in which a buffer can be used to exactly cancel out the phase adjustments.

Figure 5:
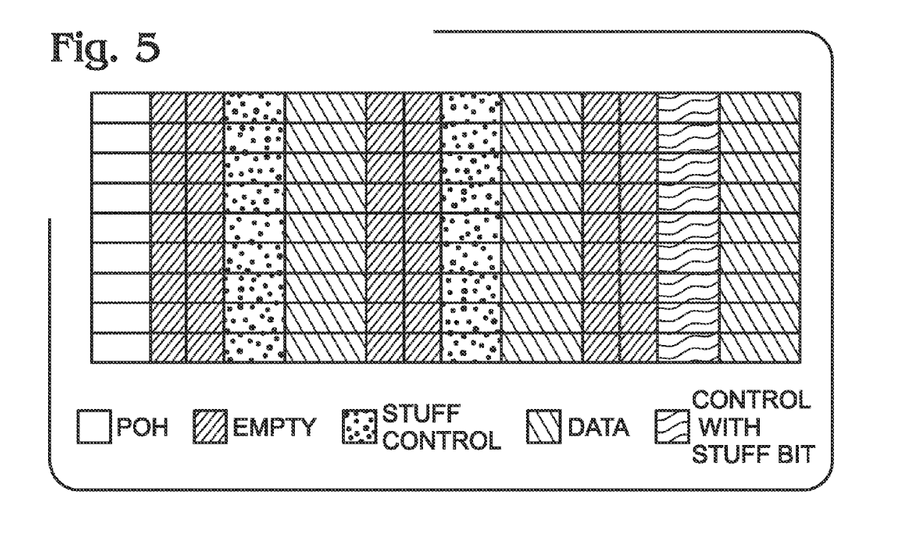
FIG. 5 depicts an STS-1 SPE with a DS3 mapped within it.

FIG. 5 depicts an STS-1 SPE with a DS3 mapped within it. The DS3 is used as an example only, to illustrate the concept. The DS3 bits are mapped mostly as bytes, but there is one byte in the STS-1 that only has 0 or 1 bits of the DS3 data. That is the only part of the mapping which is controlled from outside the mapper, by the stuff controller. The rest of the mapping pattern is fixed and is controlled by the mapper.

The SPE consists of the mapped DS3 data, and one column of path overhead (POH) bytes which are added to the frame constructed by the mapper. The full STS-1 also has 3 columns of TOH bytes, which are added onto the SPE using the outgoing clock. Of these 3 columns, one row, consisting of the H-bytes, is also included in the overhead (TOH in SONET).

In one aspect, the TOH bytes, as well as H1 and H2 pointer bytes are added to the SPE and an STS-1 frame constructed before it is sent to the transmitter. The transmitter would then strip the TOH bytes, put the rest of the data into the buffer, and regenerate the frame on the outgoing clock by taking data out of the buffer to reconstruct the frame on the outgoing side. Generated TOH would be inserting into the SPE at that point. In another aspect (see FIG. 2), this process is simplified by not sending TOH bytes to the transmitter. Instead of a conventional pointer processor, which has to remove and add TOH, the present invention transmitter generates TOH bytes at the time of transmission. Therefore, when the information bytes are being transferred from the mapper to the transmitter, there is some "blank time" corresponding to those TOH bytes that accompany the information bytes in a conventional system. Alternately stated, the mapper sends a STS-1 frame for example) without the 3 columns of TOH bytes. Additionally, there may be other blank times, for example, there may be blank times associated with the STS fixed stuff columns.

Conventionally, there are two mechanisms for controlling the overall data rate, stuffing and pointer adjustments. Typically, the STS-1 is generated at nominal rate relative to the system clock. The DS3 is mapped into the STS-1 by adjusting whether the special byte mentioned above carries 0 or 1 bits of DS3. This way, the number of DS3 bits in an STS-1 frame can be adjusted. The SPE is then put into the STS-1 (or STS-n) in the pointer processor. If the line clock is the same as the system clock, no movement of bytes takes place at the STS-1 level. If the line clock is different, then the pointer processor adapts the rate of SPE (which was created at a nominal rate relative to system clock) into the line clock rate by adjusting the SPE position via SONET pointer movements. This causes the entire SPE to shift around within the STS-1 frame.

So the conventional data rate adaptation can be expressed goes as follows:

DS3 rate adapted into nominal STS-1 SPE via stuffs+SPE adapted into STS-1 at line rate via pointer adjustments.

The pointer adjustments are made by monitoring the pointer processor buffer and making a byte adjustment.

In contrast, the present invention still measures the difference between the line and system clocks and decides if an extra or less byte is needed. But instead of creating a pointer adjustment, rate adjustment information is sent back into the mapper to regulate the data rate. This is done by either requesting the mapper to "speed" up and use one of the available "blank times" referred to earlier to send an SPE byte earlier than it would have otherwise been sent, or to request the mapper to "slow down" by not using one of the regular SPE byte opportunities to send a byte. This process only delays or pulls ahead the SPE, and the SPE itself is still generated in the same structure.

Figure 6:
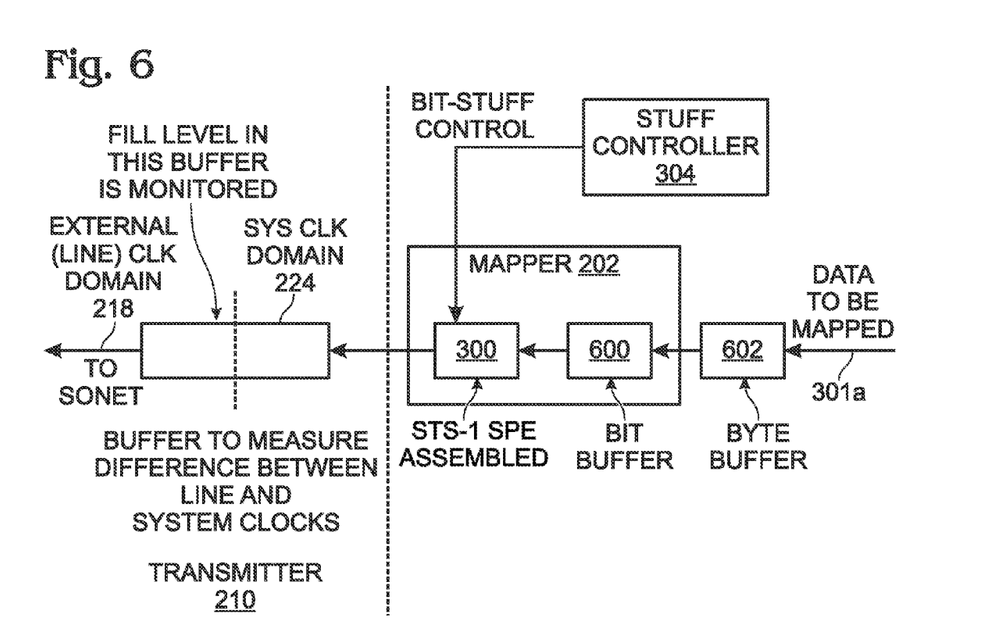
FIG. 6 is a schematic block diagram of a third variation of the SPE mapping system of FIG. 2.

FIG. 6 is a schematic block diagram of a third variation of the SPE mapping system of FIG. 2. The mapper 202 has a bit buffer 600 which is more than a byte in size (e.g., 16 bits, or 2 bytes). The mapper continuously monitors the bit buffer, and whenever it is less than a byte full, it fills it with demapped PDH data from byte buffer 602. When the mapper needs to send a byte to the transmitter, it takes that byte from the bit buffer as 8 bits. When it needs to put a bit into the SPE being assembled in the second buffer 300 under the command of the stuff controller 304 or as part of the normal mapping pattern, it takes that bit(s) from the bit buffer 600. So, when the SPE has to be sped up, what really happens is that ultimately a byte is requested from the byte buffer 602 sooner than it might otherwise have been. Similarly, when the SPE has to be slowed down, a byte is requested from the byte buffer 602 later than it might otherwise have been. Note that both of these events have the effect of slowing or speeding up the delivery of SPE to the transmitter first buffer, which in turn means that the data rate being sent to it is varied.

When the SPE is being generated with respect to the system clock, the fill of the byte and bit buffers is monitored by a stuff controller mechanism, to decide if the outgoing stuff rate is appropriate for the rate at which data is coming into the byte buffer. In steady state, the two rates match. However, if the rate at which bytes are pulled out of the byte buffer is sped up or slowed down, this steady state matching of stuffs to the incoming PDH bit rate sees a perturbation, and the stuff rate must be modified. That is why rate commands from the transmitter monitor are sent to both the mapper, as well as the stuff controller. The stuff controller combines the rate command information with the monitored fill of the byte & bit buffers (600 and 602) to smooth the stuffs to account for adjustments in the nominal system clock-based data rate.

In other words, when the mapping is done strictly to the system clock (as is conventional):

the stuff rate=PDH rate coming in.

When the additional "early/late" adjustments are required:

Stuff rate=PDH rate coming in+"early/late" factor, which is equal to the difference in the rate between the line (external) clock and the system clock.

In summary, the systems depicted in FIGS. 2-4 and 6, and described above, include a mechanism for measuring the difference between the line and system clocks, with a threshold to determine when a defined amount of extra or less data have been accumulated, which is used to create the phase adjustment (rate command) signal. A phase adjustment of suitable polarity adds or deletes an available byte opportunity in the SPE being created by the system clock. In the case when there is a conventional pointer attenuator associated with received pointers, the present invention system multiplexes the phase adjustment signal with existing pointers. When the outgoing line clock is the same as the incoming line clock (line loop timing), the present invention system may include a buffer or cancellation mechanism for storing phase adjustments from the receive and transmit sides, and a mechanism for merging the receive and transmit side adjustments so that they are cancelled out.

Figure 7:
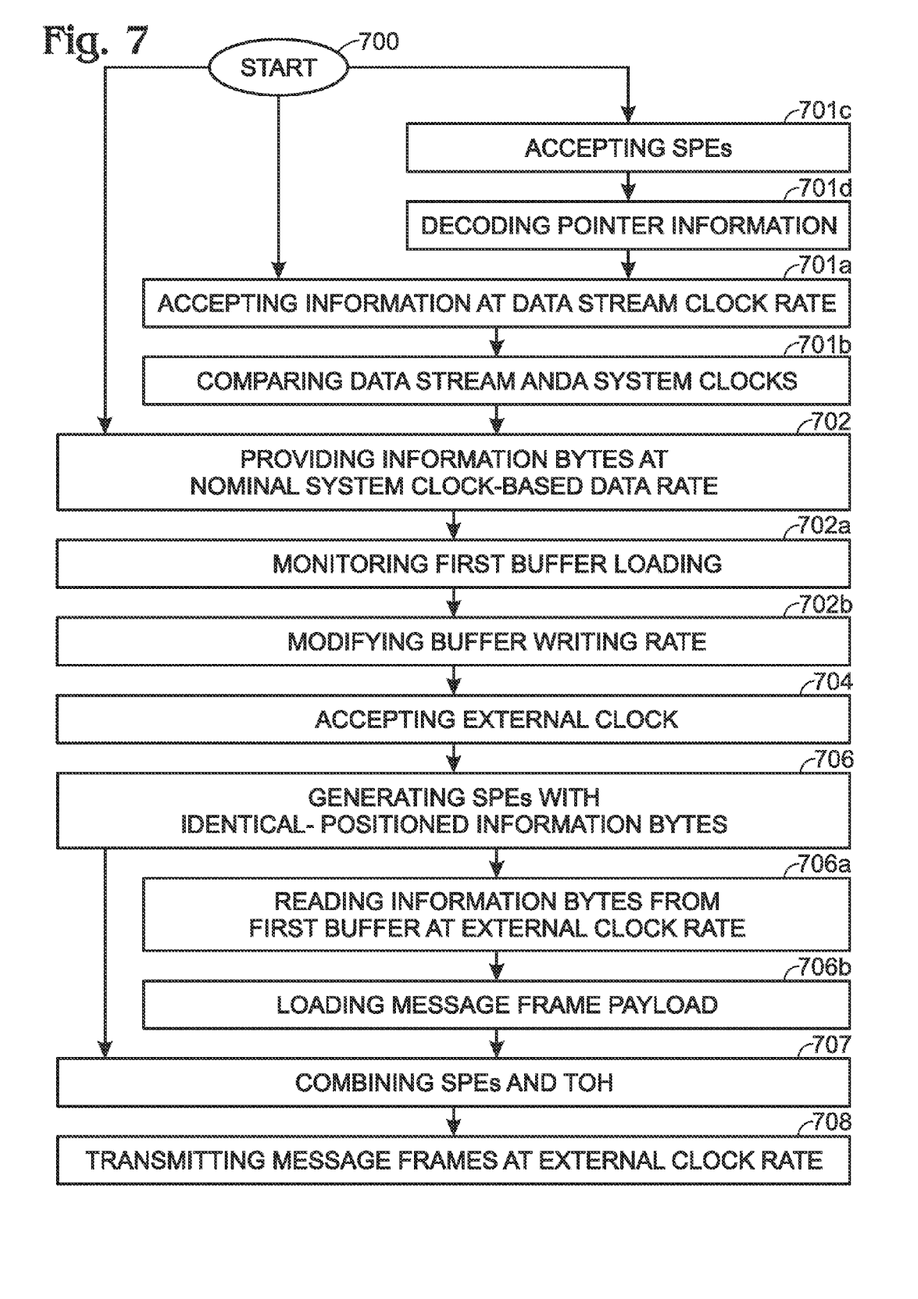
FIG. 7 is a flowchart illustrating a method for mapping information into SPEs.

FIG. 7 is a flowchart illustrating a method for mapping information into SPEs. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 700.

Step 702 provides information bytes at a nominal system clock-based data rate, responsive to a system clock. Step 704 accepts an external clock (e.g., a line clock) with a rate approximately equal to the system clock rate. Step 706 generates SPEs with identically-positioned information bytes, regardless of differences between the system and external clock rates. Step 707 combines TOH with the SPEs, creating message frames. Step 708 transmits the message frames at the external clock rate. For example, information bytes provided in Step 702 may be a PDH data stream, and Step 708 may transmit SDH or SONET frames.

In one aspect, generating SPEs with identically-positioned information bytes in Step 706 includes maintaining the positions of the information bytes within each SPE, without pointer adjustments, despite differences between the system and external clock rates. In another aspect, Step 707 creates message frames with payload (as well as TOH) sections, and exclusively locates information bytes in the payload of the message frames. In a different aspect, Step 707 combines TOH with SPEs by using pointer bytes in the TOH, to point to the start of a subsequent SPE, and exclusively locates information bytes in the payload of the message frames (Step 708) by maintaining constant pointer byte values in each message frame.

In one aspect, providing information bytes at the nominal system clock-based data rate in Step 702 includes writing the information bytes into a first buffer at a rate about equal to the system clock rate. Writing the information bytes into the first buffer at a rate about equal to the system clock rate may include substeps. Step 702a monitors the number of bytes loaded in the first buffer, and Step 702b modifies the first buffer writing rate in response to the monitoring. The first buffer writing rate can be modified as follows:

in the event of monitoring a first buffer underfill condition, writing data at a rate faster than the system clock rate; and, in the event of monitoring a first buffer overfill condition, writing data at a rate slower than the system clock rate.

Generating SPEs with identically-positioned information bytes in Step 706 may also include substeps. Step 706a reads the information bytes from the first buffer at the external clock rate. Step 706b loads the information bytes into a message frame payload section.

In another aspect, Step 701a accepts information bytes at a data stream clock rate (e.g., a PDH data stream). Step 701b compares the data stream clock rate to the system clock rate. Then, providing information bytes at the nominal system clock rate in Step 702 includes providing information bytes with stuff bit opportunities responsive to: differences between the date stream clock rate and the system clock rate; and, modifications in the first buffer writing rate due to first buffer underfill and overfill conditions.

In a different aspect, Step 701c accepts SPEs at the external clock rate, and Step 701d decodes the accepted SPE pointer information. Then, providing information bytes at the nominal system clock-based data rate in Step 702 includes providing information bytes responsive to: the decoded SPE pointer information; and, modifications in the first buffer writing rate due to first buffer underfill and overfill'conditions. In one aspect, Step 702 writes information bytes into the first buffer at a rate equal to the external clock rate.

A system and method have been provided for mapping information into SPEs. Some exemplary block diagram circuitry and process details have been presented to illustrate the invention. However, the invention is not limited to merely these examples. Other variations and embodiments of the invention will occur to those skilled in the art.

We claim:

1. A method for mapping information into Synchronous Payload Envelopes (SPEs), the method comprising:
   providing information bytes at a nominal system clock-based data rate, responsive to a system clock;
   accepting an external clock with a rate approximately equal to the system clock rate;
   regardless of differences between the system and external clock rates, generating SPEs with identically-positioned information bytes by maintaining the positions of the information bytes within each SPE, without pointer adjustments;
   combining SPEs with Transport Overhead (TOH) to create message frames; and,
   transmitting the message frames at the external clock rate.

2. The method of claim 1 wherein generating SPEs with identically-positioned information bytes includes creating message frames with payload sections, and exclusively locating information bytes in the payload of the message frames.

3. The method of claim 2 wherein combining SPEs with TOH includes using pointer bytes in the TOH, to point to the start of a subsequent SPE; and,
   wherein exclusively locating information bytes in the payload of the message frames includes maintaining constant pointer byte values in each message frame.

4. The method of claim 1 wherein providing information bytes at the nominal system clock-based data rate includes writing the information bytes into a first buffer at a rate about equal to the system clock rate;
   wherein generating SPEs with identically-positioned information bytes includes building each SPE as follows:
     reading the information bytes from the first buffer at the external clock rate; and,
     loading the information bytes into a message frame payload section.

5. The method of claim 4 wherein writing the information bytes into the first buffer at a rate about equal to the system clock rate includes:
   monitoring the number of bytes loaded in the first buffer; and,
   modifying the first buffer writing rate in response to the monitoring.

6. The method of claim 5 wherein modifying the first buffer writing rate includes:
   in the event of monitoring a first buffer underfill condition, writing data at a rate faster than the system clock rate; and,
   in the event of monitoring a first buffer overfill condition, writing data at a rate slower than the system clock rate.

7. The method of claim 6 further comprising:
   accepting information bytes at a data stream clock rate;
   comparing the data stream clock rate to the system clock rate;

wherein providing information bytes at the nominal system clock rate includes providing information bytes with stuff bit opportunities responsive to:
  differences between the date stream clock rate and the system clock rate; and,
  modifications in the first buffer writing rate due to first buffer underfill and overfill conditions.

8. The method of claim 6 further comprising:
  accepting SPEs at the external clock rate;
  decoding accepted SPE pointer information;
  wherein providing information bytes at the nominal system clock-based data rate includes providing information bytes responsive to:
    the decoded SPE pointer information; and,
    modifications in the first buffer writing rate due to first buffer underfill and overfill conditions.

9. The method of claim 8 wherein supplying information bytes at the nominal system clock-based data rate includes writing information bytes into the first buffer at a rate equal to the external clock rate.

10. The method of claim 1 wherein providing information bytes includes providing a Plesiochronous Digital Hierarchy (PDH) data stream; and,
  wherein transmitting the message frames includes transmitting Synchronous Digital Hierarchy (SDH)/Synchronous Optical Network (SONET) frames.

11. A system for mapping information into Synchronous Payload Envelopes (SPEs), the system comprising:
  a mapper having an interface to accept a system clock and an interface to provide information bytes at the nominal system clock-based data rate responsive to the system clock; and,
  a transmitter including:
    an interface to accept the information bytes from the mapper;
    an interface to accept an external clock with a rate approximately equal to the system clock rate;
    a Transport Overhead (TOH) byte insertion module;
    a summing module having an interface to accept TOH, an interface to accepts SPEs, each SPE having identically-positioned information bytes, regardless of differences between the system and external clock rates, and an interface to transmit message frames at the external clock rate.

12. The system of claim 11 wherein the transmitter maintains the positions of the information bytes within each SPE, without pointer adjustments, despite differences between system and external clock rates.

13. The system of claim 12 where the transmitter transmits message frames with payload sections, and exclusively locates information bytes in the payload of each message frame.

14. The system of claim 13 wherein the transmitter includes a pointer module, the pointer module generating pointer bytes to point to the start of a subsequent SPE, where the pointer byte values remain constant for each SPE; and,
  wherein the summing module locates the pointer bytes in the TOH of the message frames.

15. The system of claim 12 wherein the transmitter includes a first buffer having an interface for writing information bytes received from the mapper at a rate about equal to the system clock rate, and an interface for supplying the buffered information bytes at the external clock rate, for insertion into a message frame payload section.

16. The system of claim 15 wherein the transmitter includes a monitor having an interface to monitor the number of bits loaded in the first buffer, and an interface to supply rate commands to the mapper, for modifying the first buffer writing rate in response to the monitoring.

17. The system of claim 16 wherein the transmitter monitor modifies the first buffer writing rate as follows:
  in the event of monitoring a first buffer underfill condition, sending a rate command to the mapper to supply data at a rate faster than the system clock rate; and,
  in the event of monitoring a first buffer overfill condition, sending a rate command to the mapper to supply data at a rate slower than the system clock rate.

18. The system of claim 17 wherein the mapper includes a second buffer having an interface to accept information bytes at a data stream clock rate, an interface to accept rate commands from the monitor, and an interface to accept stuff commands for controlling stuff bit opportunities in the information bytes;
  the system further comprising:
  a stuff controller having interfaces to accept the system clock, the data stream clock, and the rate commands, the stuff controller comparing the data stream clock rate to the system clock rate and rate commands, and providing stuff commands to the mapper responsive to comparisons.

19. The system of claim 17 further comprising:
  a receiver having an interface to accepts SPEs at the external clock rate, an interface to supply accepted SPE information bytes to the mapper, and an interface to supply SPE pointer information;
  a cancellation mechanism having an interface to accept the SPE pointer information from the receiver, an interface to accept the rate commands from the transmitter monitor, and an interface to supply rate commands to the mapper, adjusted in response to decoded SPE pointer information and the rate commands; and,
  wherein the mapper supplies information bytes to the transmitter first buffer in response to the adjusted rate commands.

20. The system of claim 19 wherein the mapper supplies information bytes to transmitter first buffer at the external clock rate.

21. The system of claim 11 wherein the mapper supplies a Plesiochronous Digital Hierarchy (PDH) data stream to the transmitter; and,
  wherein the transmitter transmits Synchronous Digital Hierarchy (SDH)/Synchronous Optical Network (SONET) frames.

22. A system for mapping information into Synchronous Payload Envelopes (SPEs), the system comprising:
  a means for providing information bytes at a nominal system clock-based data rate, responsive to a system clock;
  a means for accepting an external clock with a rate approximately equal to the system clock rate;
  regardless of differences between the system and external clock rates, a means for generating SPEs with identically-positioned information bytes by maintaining the positions of the information bytes within each SPE, without pointer adjustments;
  a means for combining SPEs with Transport Overhead (TOH) to create message frames; and,
  a means for transmitting the message frames at the external clock rate.

* * * * *